(12) United States Patent
Wang et al.

(10) Patent No.: US 9,790,388 B2
(45) Date of Patent: Oct. 17, 2017

(54) RADIATION-CURABLE INKJET INK FOR APPLICATION TO GLASS, CERAMIC, OR METAL

(71) Applicant: Electronics for Imaging, Inc., Fremont, CA (US)

(72) Inventors: Jiangping Wang, Novi, MI (US); Matthew Tennis, Howell, MI (US); Mark Zavada, Wixom, MI (US); Huilei Zhang, Ypsilanti, MI (US); Paul Edwards, Kalamazoo, MI (US); Loius Justus Fage, Farmington, MI (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 14/887,188

(22) Filed: Oct. 19, 2015

(65) Prior Publication Data
US 2017/0107388 A1    Apr. 20, 2017

(51) Int. Cl.
*B41J 2/14* (2006.01)
*C09D 11/38* (2014.01)
*C09D 4/00* (2006.01)
*C09D 7/12* (2006.01)
*C09D 11/101* (2014.01)

(52) U.S. Cl.
CPC ............... *C09D 11/38* (2013.01); *C09D 4/00* (2013.01); *C09D 7/1216* (2013.01); *C09D 11/101* (2013.01)

(58) Field of Classification Search
CPC ........................... B41J 2/14032; C09D 11/38
See application file for complete search history.

(56) References Cited

U.S. PATENT DOCUMENTS

| 4,390,565 | A | 6/1983 | Fonda |
| 4,416,974 | A | 11/1983 | Scheve |
| 4,649,062 | A | 3/1987 | Kosiorek et al. |
| 4,900,763 | A | 2/1990 | Kraushaar et al. |
| 6,517,943 | B1 * | 2/2003 | Beunet .................. C03C 8/02 427/374.1 |
| 7,803,221 | B2 | 9/2010 | Magdassi et al. |
| 8,163,077 | B2 | 4/2012 | Feinschmidt et al. |
| 8,632,630 | B2 * | 1/2014 | Robertson .............. C09D 11/30 106/31.37 |

(Continued)

*Primary Examiner* — Jason Uhlenhake
(74) *Attorney, Agent, or Firm* — Perkins Coie LLP (57) ABSTRACT

A radiation-curable ink composition for application to glass, ceramic, or metal by an inkjet printer. The ink composition can be applied to a glass, ceramic, or metal substrate to decorate, protect, etc. the substrate. In some embodiments, the ink composition includes a glass frits component, a chromophore component, and a UV-curable component. The glass frits component facilitates the fusing of the ink component with a glass, ceramic, or metal substrate to which the ink composition is applied. The chromophore component is the primary colorant of the ink composition. The UV-curable component facilitates activation of polymerization upon exposure to ultra-violet (UV) radiation, which causes the ink composition to cure and fix/pin to the underlying substrate. After the ink composition is applied to a substrate and cured by exposure to UV radiation, the substrate is heated to a temperature that causes the ink composition to fuse with the substrate.

35 Claims, 4 Drawing Sheets

(56) References Cited

U.S. PATENT DOCUMENTS

| | | | |
|---|---|---|---|
| 8,993,102 B2 | 3/2015 | Shipway | |
| 2008/0089732 A1* | 4/2008 | Szoke | B41J 11/057 400/662 |
| 2009/0214840 A1* | 8/2009 | Eron | B41J 3/407 428/210 |
| 2011/0249056 A1 | 10/2011 | Weingartner | |
| 2012/0145017 A1* | 6/2012 | Hill | B41J 2/14032 101/129 |
| 2013/0187983 A1 | 7/2013 | Eron | |
| 2013/0222499 A1* | 8/2013 | Cong | B41J 2/2107 347/102 |
| 2013/0265376 A1 | 10/2013 | Gil-Torrente et al. | |
| 2014/0044894 A1 | 2/2014 | Shipway et al. | |
| 2014/0139598 A1* | 5/2014 | Otobe | B41J 2/17513 347/86 |
| 2014/0192111 A1* | 7/2014 | Nagai | C09D 11/32 347/20 |
| 2015/0225581 A1 | 8/2015 | Kida et al. | |

* cited by examiner

RADIATION-CURABLE INKJET INK FOR APPLICATION TO GLASS, CERAMIC, OR METAL

FIELD OF THE INVENTION

The invention generally relates to the field of inkjet inks. More particularly, the invention relates to a radiation-curable inkjet ink for application to glass, ceramic, or metal.

BACKGROUND

Ceramic inks can be used for glass decoration, and often include mineral-based pigments and glass frits. Once applied to a glass substrate, the ink is heated to a temperate where some components of the ink, such as the glass frits, melt. When the ink is heated to a high temperature, such as to above 500 degrees Celsius (C.), components of the ink will melt and fuse into the substrate and will form a permanent bond.

Some ceramic inks include three major components: glass frits, inorganic pigments, and organic components. The organic components, including solvents, dispersants, additives, etc., serve as a carrier vehicle for the pigments and frits. In one example, the ceramic ink is first applied to a substrate, such as a glass substrate. After application to the glass substrate, the substrate is heated to cause the ceramic ink to dry and pin to the substrate. After the ceramic ink has dried, the substrate is placed in a kiln, for example, to temper, bend, thermally strengthen, etc. the substrate. Once heated to a sufficiently high temperature, such as above 500 degrees C., the frits/pigments fuse to the surface of the substrate.

BRIEF DESCRIPTION OF THE DRAWINGS

Embodiments of the present invention will be described and explained through the use of the accompanying drawings in which.

SUMMARY

Introduced here is a radiation-curable ink composition for application to glass, ceramic, or metal by an inkjet printer, and an associated method for applying the ink. The ink composition can be applied to a glass, ceramic, or metal substrate to decorate, protect, etc. the substrate. In some embodiments, the ink composition includes a glass frits component, a chromophore component, and a UV-curable component. The glass frits component facilitates the fusing of the ink component with a glass, ceramic, or metal substrate to which the ink composition is applied. The chromophore component is the primary colorant of the ink composition. The UV-curable component facilitates activation of polymerization upon exposure to ultra-violet (UV) radiation, which causes the ink composition to cure and fix/pin to the underlying substrate. The ink composition can be applied to a variety of substrates and for a variety of applications, e.g., to a flat piece of glass to decorate the glass, to an automobile windshield to tint the windshield to reduce glare from the sun, to a piece of metal to print a road sign or an advertisement, to a bottle to label or decorate the bottle, etc.

The ink composition can be applied in a single layer, or in multiple layers. In some embodiments, one or more layers of an ink composition that includes a chromophore component and a UV-curable components can be applied. In other embodiments, one or more layers of an ink composition that includes a glass frits component and a UV-curable components can be applied. Further, multiple ink compositions can be applied with any of various orderings, such as 3, 333, 32, 212, 12, 21, 1212, 1122, 2211, 1221, 12321, etc. (where "1" represents a layer of a first ink composition, such as an ink composition that includes a chromophore component and a UV curable component, "2" represents a layer of a second ink composition, such as an ink composition that includes a frits component and a UV curable component, and "3" represents a layer of a third ink composition, such as an ink composition that includes a frits component, a chromophore component, and a UV curable component).

After a layer of the ink composition is applied to a glass, metal, or ceramic substrate, the ink composition can be quickly cured and fixed to the substrate upon exposure to UV radiation, which activates polymerization of the ink composition resulting in a durable cured ink which facilitates handling of the substrate without damage to the cured ink. When multiple layers of the ink composition are applied to the glass, metal, or ceramic substrate, each of the multiple layers of the ink composition can be quickly cured and fixed to the substrate upon exposure to UV radiation. After the ink composition is cured, the substrate can be heated, such as by being placed in a kiln, to cause the glass frits of the ink composition to fuse with the substrate. The substrate may be placed in the kiln, for example, to temper, bend, thermally strengthen, etc. the substrate.

DETAILED DESCRIPTION

Introduced here is a radiation-curable ink composition for application to glass, ceramic, or metal by an inkjet printer to decorate, protect, etc. the glass, ceramic, or metal. Ceramic inks that have been used for application to glass have a number of issues. For example, many ceramic inks are solvent-based and include mineral-based pigments and glass frits. Solvent-based inks have a high VOC (volatility of organic compound), and chemical components of such inks, such as the solvent(s) of the ink, easily evaporate at room temperature.

For proper drying of a solvent-based ink, the solvent needs to be evaporated after being printed, such as by exposing the ink to heat or infrared radiation. A solvent-based ink that includes frits can be applied to a glass surface at a thickness of about 30 microns to 60 microns. The solvent-based ink can be dried by heating the ink to between 100 and 150 degrees Celsius (C.) for 10 minutes, which reduces the thickness of the ink by about two thirds. In one example, a solvent-based ink is applied to a glass surface at a thickness of the ink of about 40 microns. After drying, the thickness of the ink reduces from about 40 microns to about 12 microns.

After drying, most of the components of the solvent-based ink, such as the organic binders, have mostly evaporated, as is demonstrated by the thickness of the ink being reduced by about two thirds. After evaporation, the primary remaining components of the solvent-based ink are a pigment, that is used as a colorant, and frits. Because the pigment and the frits are like a powder, and because there is no durable binder to bind the pigment or frits, the dried ink has a low green strength. Green strength of a ceramic ink is the strength of the ink after the ink is dried/cured and before the ink is fused with a substrate, such as by being fired in a kiln.

Solvent based inks have an issue when applied to non-absorbent or non-porous materials, such as glass, ceramic, or metal. Before the solvent-based ink is cured, and as a result of having a low green strength, the ink can often be easily rubbed off of the material to which the ink is applied. Additionally, some of the evaporated chemical components of solvent-based inks pose a health hazard to people who are exposed to the evaporated chemical(s) during the process of applying the ink to the substrate and curing the ink.

In another example, when a solvent-based ink is applied to a porous substrate, such as to paper, the ink securely fixes (i.e., pins) to the substrate due to absorption of the ink by the substrate and evaporation of the solvent from the ink. As discussed above, when a solvent-based ink is applied to a non-porous substrate, such as to glass, ceramic, or metal, the ink poorly fixes to the substrate. Due to the poor fixing, the ink often runs, which can create streaks in the ink or result in poor image quality when being used to apply an image to the substrate. The poor fixing exacerbates the issue of the ink being easily rubbed off or scratched during handling of the substrate, such as when handled for transport, packaging, etc. Techniques, such as applying high-energy drying systems or preheating the substrate to cause the solvents of the ink to evaporate quickly after application to the substrate, can still result in the ink running, in poor image quality or resolution, in the image being easily rubbed off or scratched, etc.

Further, solvent-based inks have additional issues when being applied to glass by inkjet printers. As a first example, many solvent-based inks have issues when being jetted by a inkjet of an inkjet printer. The viscosity of the solvent-based ink may be too high, or the size of the frit may be too large, to enable the solvent-based ink to reliably flow though and be jetted by the inkjet. As a second example, solvent-based inks have inferior nozzle open time. Because evaporation of the solvent(s) of a solvent-based ink helps the ink to cure, the solvent(s) are chosen to accelerate evaporation and reduce drying times. As a result, while the ink is in the inkjet printer, the ink can begin to dry out and cure, which can result in the clogging of the jets and other components of the inkjet printer. This drying of the ink creates a need for additional maintenance cycles to keep the nozzles of the inkjet open, which increases the down-time of the inkjet printer, and for specialized capping systems to prevent the ink from drying out while in the inkjet printer.

Radiation-curable inks enjoy a number of advantages over solvent-based inks. Radiation curing is a process whereby organic coatings, such as inks, are cured or hardened by exposure to electromagnetic radiation, such as UV light. As a first example of such an advantage, a radiation-curable ink may not include a solvent, or may include a small amount of a solvent. In various embodiments, a radiation-curable ink has a VOC of less than 1%, 0.5%, or 0.3% per unit of mass of the radiation curable ink. The elimination or reduction of the amount of the solvent enables the radiation-curable ink to have a low VOC, with an associated low or even substantially zero evaporation of chemical components of the ink. This low evaporation reduces the health hazard that arises when chemical components of the ink are inhaled during the process of applying the ink to the substrate and curing the ink, due to there being very little or even substantially no evaporated chemical components of the ink.

As another example, a radiation-curable ink, after being applied to a glass, ceramic, or metal substrate, can be quickly cured by exposure to radiation, and can result in a cured ink that is hard or rigid and well-fixed to the substrate, and that has a much higher green strength than a solvent-based ink. Some radiation-curable inks are thermoset systems, which, after curing, typically become hard or rigid as a result of the three-dimensional cross-linking that occurs between molecular chains. This mechanical strength of the cured ink, and the enhanced fixation of the cured ink to the substrate, enhances the ability of the substrate to be handled without damaging the cured ink. As discussed above, a solvent-based ink can lose about two thirds of its thickness during drying due to evaporation, resulting in a low green strength dried ink. In contrast, a radiation-curable ink can have a minimal loss of thickness after curing, resulting in a high green strength cured ink.

Further, a radiation-curable ink can be individualized to increase the flexibility of the ink once cured, which helps to prevent delamination of the cured ink from the substrate to which the ink is applied. Additionally, the curing of the ink after application to the substrate can be very quick, and even substantially instantaneous, which enhances the quality and resolution of images that are printed on the substrate due to the quick fixation of the ink to the substrate and the associated quick curing of the ink.

Radiation-curable inks, similar to solvent-based inks, can suffer from a number of issues when applied to glass, ceramic, or metal. For example, the viscosity of a screen printed radiation-curable ink may be too high, or the size of the frit may be too large, to enable the ink to flow reliably though and be jetted by an inkjet of an inkjet printer. Further, some radiation-curable inks include curable components that enhance fixation of drops on, e.g., a glass substrate, but that do not sufficiently enhance the mechanical strength and hardness of the cured ink to enable reliable handing of the glass substrate. Additionally, some radiation-curable inks include colorants which are not able to withstand the temperatures utilized during glass fabrication, such as organic pigments.

An embodiment of the radiation-curable ink composition introduced here, referred to herein as "ink composition A," includes a glass frits component, a chromophore component, and a UV-curable component. Another embodiment of the radiation-curable ink composition, referred to herein as "ink composition B," includes a chromophore component and a UV-curable component. Yet another embodiment of the radiation-curable ink composition, referred to herein as "ink composition C," includes a glass frits component and a UV-curable component. The glass frits component of some embodiments has a low melting point. In some of these embodiments, the melting point is below 750 C, in other embodiments, the melting point is below 600 C, and in yet other embodiments, the melting point is below 550 C.

The glass frits component can be individualized based on the characteristics of the substrate to which the ink composition is to be applied. A component can be individualized for a desired trait, characteristic, use, etc. by, for example, being selected, formulated, designed, etc. to achieve the desired trait or characteristic, to perform the desired use, etc. As one example, the glass frits component can be individualized by selecting a type of glass frits to use in the glass frits component based on the melting point of the substrate onto which the ink component is to be applied, and based on the melting point of the frits. By having a glass frits component with a low melting point, the ink composition can be fused to a substrate at a lower temperature, which reduces or eliminates damage to the substrate due to heating.

Further, the frits of the glass frits component can be chosen to have a median diameter (D50) small enough to reliably flow through and be jetted by an inkjet of an inkjet printer. The frits can be chosen to have a D50 of less than 10 microns for inkjet printers with larger openings or passageways in the inkjet and in other inkjet printer components. Other inkjet printers with smaller openings or passageways can accommodate frits with a D50 of less than 3 microns.

Additionally, the frits of the glass frits component can be chosen to have a coefficient of thermal expansion (CTE) that is matched to the substrate to which the radiation-curable ink composition is to be applied. In some embodiments, the frits are chosen to have a CTE that is substantially the same as the CTE of the substrate. For example, when the substrate is glass, frits can be chosen that have a CTE of less than 12 parts per million per degree C. (ppm/C.), and that is preferably less than 9 ppm/C. When the frits do not have a CTE that is adequately matched to the substrate, image quality will suffer as the substrate is fired in a kiln and the frits and the substrate expand at different rates, thereby negatively impacting image quality.

The chromophore component, which is the primary colorant of embodiments of the ink composition that include a chromophore component, is individualized based on temperatures utilized during processing of the substrate, among others. For example, a glass substrate may need to be tempered, which requires being heated to a certain high temperature, such as to 625-750 C after being placed in a kiln. The chromophore component can include an inorganic pigment that is individualized to obtain or maintain a desired color after being fused with a glass, ceramic, or metal substrate. In some embodiments, the chromophore component includes an inorganic pigment that can maintain color performance at up to 800 C, such as a metal-oxide pigment.

The UV-curable component, which can act as a vehicle to carry the glass frits component and/or the chromophore component, can be individualized based on desired properties of the ink composition, such as the desired hardness of the ink composition after curing, the ability of the UV-curable component to "burn off" when the substrate on which the ink composition is applied is heated to fuse the ink composition with the substrate, etc. As one example, the UV-curable component can be individualized to facilitate the ink composition, which includes in various embodiments the glass frits composition and/or the chromophore composition, being jetted by an inkjet. Such individualization can include individualizing the UV-curable component to achieve a desired viscosity, surface tension, etc. of the ink composition. As another example, the UV-curable component can be individualized to achieve a desired burn off, such as by adding oxygen to the UV-curable component to enhance the burn off of the cured ink during, for example, firing in a kiln. The oxygen can be added to the UV-curable component by, for example, adding a monomer that contains a desired amount of oxygen to the UV-curable component.

Further, some embodiments of the ink composition enable layering of the ink composition on a glass, ceramic, or metal substrate. In some embodiments, ink composition A is used for each ink composition layer. In such embodiments, the various ink composition layers can use the same ink composition A, or can be different formulations of ink composition A. Formulations of ink composition A can differ in any of various ways. For example, the chromophore and/or glass frits component can be varied to change the color of the ink composition, the formulation of the UV-curable component can be changed to achieve a desired viscosity for the ink formulation, etc.

In other embodiments, ink composition B is used for some ink composition layers, while ink composition C is used for other ink composition layers. In these embodiments, various combinations of layers can be layered. For example, ink composition B can be first applied, followed by a ink composition C, followed by ink composition B, etc. In some embodiments, all three types of ink composition types can be layered. For example, ink composition A can be first applied, followed by ink composition C, followed by ink composition B. Each applied layer of the ink composition can be cured by exposure to radiation before the next layer of the ink composition is applied.

Layering of an ink composition may be desirable to, for example, provide a background behind an image, to enhance the color performance of the top layer of ink, such as by placing a white background behind the image, to enhance color performance of an ink layer by placing a color enhancing layer between two layers, such as by placing a white layer between two colored layers, to achieve a desired glossiness or texture of the surface of the applied ink, etc.

When some inks are applied to non-porous surfaces, as previously discussed, the inks may not fix well to the surface. As a result, when a first layer of ink is applied to a surface to form an image, and a second layer of the ink is applied to the surface, the two layers of ink can bleed together, impairing the quality of the image. This problem is alleviated when each applied layer of an ink composition is cured before application of the next layer of the ink composition. When each applied layer of an ink composition is cured before application of the next layer, each cured applied layer has the mechanical strength to substantially prevent bleeding together of other applied layers of the ink composition.

Ink Composition

Some embodiments of a radiation-curable inkjet ink composition cure quickly with minimal radiation exposure, enabling high-printing speed of images on glass, ceramic, or metal substrates, such as on a bottle. After curing, the ink is mechanically robust and is firmly fixed on the surface, giving excellent performance on a wide range of glass, ceramic, or metal substrates, greatly expanding the range of applications for the ink, and greatly enhancing the ability of the substrate to be handled without damaging the cured ink.

As previously discussed, some embodiments of the ink composition introduced here, such as ink compositions A, B, and C, include a UV curable component, a glass frits component, and/or a chromophore component.

Glass Frits Component

The glass frits component includes low temperature glass frits, and is added in a predetermined concentration to the ink composition. The predetermined concentration can be between 0 and 70% by weight of the ink composition, with a preferred range of between 20 and 45% by weight of the ink composition. The glass frits used in the glass frits component are low temperature glass frits, with a melting point of between 450 C and 750 C. The glass frits can be individualized to meet heating requirements of the glass, ceramic, or metal substrate. For example, in some embodiments the glass frits are selected to achieve a melting point of less than 550 C, while in other embodiments the glass frits are selected to achieve a melting point of less than 750 C, and in yet other embodiments the glass frits are selected to achieve a melting point between 600 C and 750 C.

In some embodiments, a glass frit component is individualized to enable a firing time of between 5 minutes and 40 minutes, where the firing time is sufficient to enable glass frits of the glass frits component to fuse with a substrate. In other embodiments, the glass frits component is individualized to enable a firing time of between 5 and 10 minutes. Proper selection of glass frits to achieve a desired melting point enables the glass frits of the ink composition to melt and fuse with the underlying substrate material at a temperature sufficiently low that the fusing process can occur without the substrate material being damaged by the fusing process.

In some embodiment, the glass frits are individualized to have a thermal expansion that substantially matches the thermal expansion of the substrate on which the ink composition is to be applied. Individualization of the glass frits to achieve such a thermal expansion facilitates the glass frits efficiently fusing with the substrate. Further, when glass frits have a different thermal expansion than the substrate onto which the ink composition is to be applied, the glass frits when heated can move around on the substrate before fusing and may not efficiently fuse with the substrate, which can reduce resolution or durability of the image being printed.

In some embodiments, the glass frits include $SiO_2$. The $SiO_2$ can be doped with flux, such as Bi, B, Zn, Na, K, F, Ca, Mg, Al, Ti, Zr, etc., and the flux can be individualized to achieve the desired melting point or other characteristics for the glass frits component or the ink composition. Embodiments of an ink composition can include ASF-1094, which is a glass frit that is available from Asahi Glass Co. of Tokyo, Japan. In some embodiments, the glass frits are lead free. Some embodiments of a glass frits component are comprised of (as an atomic percentage): O: 40-90%, Si: 1-30%, B: 0-50%, Bi: 0-30%, F: 0-15%, Na/K/Ca/Mg: 0-30%, Al: 0-5%, Zn: 0.5-30%, Ti: 0-5%, Zr: 0-15%, others 0-30%.

The frits of the frits component can be individualized to facilitate reliable flow of the ink composition through an inkjet and jetting by the inkjet. Inkjets come with nozzle openings in a variety of sizes. To facilitate reliable usage of the ink composition in an inkjet with a large nozzle, frits can be individualized to a D50 of less than 10 microns. To facilitate reliable usage of the ink composition in an inkjet with a small nozzle, frits can be individualized to a D50 of less than 3 microns. The frits of the frit component can include a chromophore, in which case the frits can act as a colorant of the ink composition.

Once applied to a glass, ceramic, or metal substrate, cured by exposure to UV radiation, and fused with the substrate by being heated to a predetermined temperature, an ink composition becomes physically part of the underlying substrate, such that removal of the ink composition can involve removing the portion of the substrate with which the ink composition has fused.

Chromophore Component

The chromophore component is the primary colorant of the ink composition, and can include one or more inorganic chromophores, such as pigments, colored glass frits, etc. The chromophore component, when added to the ink composition, is added to the ink composition in a predetermined concentration, which can range from 5 to 70% by weight of the ink composition, and is preferably between 10 and 50% by weight of the ink composition. In embodiments where the ink composition is not colored, such as when the ink composition is used to provide a clear coating, the ink composition may have 0% chromophore component (e.g., some formulations of ink composition B). In some embodiments, in order to balance the fusing of frits into an underlying substrate and the intensity of color of a radiation-cured ink, the ratio of frits to pigment, by mass, is between 1.5 to 1, and 3 to 1.

The chromophore(s) of the chromophore component can be individualized to facilitate reliable flow of the ink composition through an inkjet and jetting by the inkjet. To facilitate reliable usage of the ink composition in an inkjet with a large nozzle, a chromophore can be individualized to a D50 of less than 10 microns. To facilitate reliable usage of the ink composition in an inkjet with a small nozzle, a chromophore can be individualized to a D50 of less than 3 microns.

After application of the ink composition to a glass, ceramic, or metal substrate, and exposure of the ink composition to UV radiation to cure or pin (i.e., fix) the ink composition, the substrate is heated. In some embodiments, application of UV radiation to pin the ink composition is optional. The UV radiation can be radiation emitted by, e.g., a UV lamp. Based on the substrate material, the substrate can be heated to between 500 C and 800 C to fuse the ink composition with the substrate. In an embodiment, the substrate is heated to between 600 C and 700 C, for example, to temper, bend, or strengthen the substrate. When fusing, glass frits of the glass frits component melt into and bond with the substrate.

The glass frits further carry chromophores of the chromophore component, which also fuse with the substrate along with the glass frits. Chromophores can be individualized, based on the temperature to which the substrate is to be heated, to maintain color performance. For example, when fusing requires a temperature of between 500 C and 800 C, the chromophores can be individualized to maintain color performance at this temperature range. In some embodiments, the chromophores are individualized to maintain color performance at between 500 C and 800 C for between 5 and 40 minutes.

A chromophore maintains color performance at a selected temperature when the chromophore maintains a desired color at that temperature. Examples of colors of chromophore include black, white, brown, pink, yellow, blue, red, and cyan, among others. A chromophore can include any of the following elements, which can act as a colorant for the chromophore: Ti, V, Cr, Mn, Fe, Co, Ni, Cu, Y, Zr, Nb, Mo, Ru, Rh, Pd, Ag, Hf, Ta, W, Pt, Au, Ce, Pr, Nd, Sm, Eu, Gd, Tb, Dy, Ho, Er, Tm, Yb, Lu, Ge, As, Se, Sn, S, P, Sb, Te, Pb, Bi, U. Embodiments of an ink composition can include chromophores, such as a Co/Al pigment, that are available from The Shepherd Color Company of West Chester Township, Ohio.

Uv-Curable Component

The UV-curable component is a UV curable vehicle that polymerizes upon exposure to UV radiation, which causes the ink composition to cure and fix to an underlying substrate. The UV-curable component is added to the ink composition in a predetermined concentration, which can be from 30 to 95% by weight of the ink composition, and is preferably between 40 and 60% by weight of the ink composition. In some embodiments the UV-curable component is comprised primarily or substantially exclusively of organic components.

The UV-curable component can consist of any of monomer, oligomer, photo-initiator, dispersant, or additive, among others. The UV-curable component can serve any of several purposes. For example, the UV-curable component can act as a vehicle to carry the chromophore component or the frits component for jetting the ink composition onto a substrate. As another example, the UV-curable component can durably bond the chromophore or frits component with the substrate when polymerization is activated by UV radiation. Such bonding facilitates handling of the substrate during further processing, such as when the substrate is packaged or transported to a kiln for firing.

The UV-curable component can include one or more photo-initiators that initiate polymerization of the UV-curable component in response to exposure to UV radiation, such as to UVA (320-400 nm wavelengths), UVB (280-320 nm wavelengths), UVC (200-280 nm wavelengths), UVV (400-450 nm wavelengths), etc.

Some embodiments of the ink compositions described herein are achieved with formulations that result in drops having a uniform spreading rate for each ink color, upon exposure to predetermined amounts of UV radiation at one or more predetermined bandwidths, which permits achievement of a controlled surface topology on the cured ink. Because different chromophores can have different UV absorption signatures, the cure rate of each ink color can be different from that for other colors. This difference in cure rates can manifest as variable drop spread across ink colors.

Because each chromophore can have a unique absorbance signature in the UV range, and because each chromophore, therefore, competes with the photo-initiator at one or more bandwidths in the UV range specific to the chromophore or the ink composition containing the chromophore in absorbing UV energy, the absorbance signature of the particular chromophore itself and/or of an ink composition containing the particular chromophore can be an important element to consider when individualizing the UV-curable component to achieve uniform drop spread across inks of different colors when exposed to UV radiation for pinning or curing.

Therefore, by tailoring one or both of the composition and the concentration of the UV-curable component in an ink composition to the absorbance signature of one or both of the chromophore and the resulting ink composition, it is possible to systematically produce inks of different colors in which drop spread is substantially uniform across ink colors, resulting in higher resolution images. Further, the speed of the movement of the substrate relative to a UV radiation source can be individualized to obtain exposure to a desired amount of UV radiation. In some embodiments, the movement of the substrate relative to a UV radiation source is between 10 and 70 feet per minute.

The ink compositions may include a plurality of types of chemical substances. Substances that share a function or property in the ink composition are collectively referred to as a component. As used herein, a functional group refers to compounds having unsaturated carbon-carbon groups that can be polymerized by exposure to radiation during the curing process to form an ink film.

The UV-curable component can be individualized, such as by selection or addition of an any of an additive, monomer, oligomer, photo-initiator, dispersant, etc. to achieve certain traits, characteristics, etc. for the ink composition. For example, to enable efficient jetting of an ink composition by an inkjet, some embodiments of the ink composition are individualized to have a viscosity of between 5 and 45 centipoises (cP) at jetting temperature, with a preferable range of between 2 and 20 cp at jetting temperature. The UV-curable component can be individualized to facilitate the desired viscosity of the ink composition. As another example, to enable efficient jetting of an ink composition by an inkjet, some embodiments of the ink composition are individualized to have a surface tension of between 20 and 50 millinewton per meter (mN/m), with a preferable range of between 24 and 34 mN/m. The UV-curable component can be individualized to facilitate the desired surface tension of the ink composition.

In some embodiments, the UV-curable component is individualized such that polymers created when the ink composition is exposed to UV radiation have a thermal expansion that is similar to the thermal expansion of the substrate on which the ink composition is to be applied. Individualization of the UV-curable component to achieve such a thermal expansion facilitates the polymers being able to stay fixed to the substrate during heating of the substrate. When the thermal expansion of a polymer does not substantially match the thermal expansion of the substrate, the polymer can delaminate from the substrate when the substrate is heated and expands at a different rate than the polymers. This delamination can prevent the frits from efficiently fusing with the substrate, which can negatively impact resolution or durability of the image being printed. Delamination of the polymer can be reduced by increasing the flexibility of the polymer, which can be accomplished by adding acrylic resin. In some embodiments, the acrylic resin is added at a concentration of less than 2% by weight of the ink formulation.

As previously discussed, a UV-curable component can durably bond the chromophore or frits component of an ink composition with the substrate when polymerization is activated by UV radiation. In some embodiments, during heating of the substrate to fuse the frits component with the substrate, it is desirable for the UV-curable component to partially or fully burn off, leaving just or primarily the frits component and the chromophore component remaining at the substrate. In some embodiments, a desired burn off of the UV-curable component is characterized by an ash content of between 5 and 70% by weight of the ink composition after heating of the substrate and fusing of the ink composition, as ash content is a key determinant in the viscosity, surface tension, and drying rate of a radiation-curable ink.

A UV-curable component can be individualized to achieve a desired burn off. For example, oxygen can be added to the UV-curable component to enhance the burn off of the cured ink composition, such as during firing in a kiln. Further, the UV-curable component can be comprised primary, or even substantially exclusively, of organic components to enhance burn off. The organic components can comprise between 30 and 95% of the ink composition by weight, and preferable between 40 and 60% of the ink composition by weight. In addition, any carbon residue remaining after the heating of the substrate and fusing of the ink composition can affect the color performance of the ink composition. In some embodiments, there is substantially no post-heating carbon residue. The UV-curable component can be individualized to facilitate the desired post-heating ash content or carbon residue of the ink composition, such as by the above described methods.

Further, it is desirable that the polymers created when the UV-curable component is polymerized by exposure to UV radiation, in addition to burning off, avoid "flowing" with elevated temperature. When polymers flow with elevated temperature, the resolution of the printed image is reduced, which is undesirable. The UV-curable component can be individualized to facilitate the desired "flowing" (or, more precisely, lack of "flowing") of the UV-curable component. The UV-curable component can flow, for example, when the polymers, created following activation of polymerization of the UV-curable component by UV radiation, flow. The polymers can flow when the substrate is heated to an elevated temperature, such as to between 600 C and 800 C.

Monomer Component

Embodiments of ink compositions can include a monomer component that is, for example, a linear monoacrylate monomer, a cyclic monofunctional monomer, an aromatic monofunctional monomer, a difunctional acrylate monomer, a trifunctional acrylate monomer, a tetra/higher functional acrylate monomer, etc. In some embodiments, the monomer component includes oxygen, which is advantageous as the availability of oxygen enhances combustion of the monomer, which enhances burn off of the cured ink composition and reduces post-burn off residue, such as ash. The monomer component can include a predetermined amount of oxygen.

In some embodiments, acrylic resin is added to the monomer component, which is advantageous as the acrylic resin enhances the flexibility of the ink composition after polymerization (e.g., after the ink composition is UV-cured). This flexibility of the cured ink composition helps to reduce delamination of the cured ink composition from the material to which the ink composition is applied. In some embodiments, the acrylic resin comprises less than 2% of the ink composition by weight.

Examples of monomer components include cycloaliphatic acrylate monomer; 2(2-ethoxyethoxy) ethyl acrylate; tetrahydrofurfuryl acrylate; lauryl acrylate; 2-phenoxyethyl acrylate; isodecyl acrylate; acrylic monomer; octyldecyl acrylate; octyl ester; tridecyl acrylate; caprolactone acrylate; isobornyl acrylate; cyclic trimethylolpropane formal acrylate; alkoxylated tetrahydrofurfuryl acrylate; 1,4-butanediol monoacrylate; alip. ureth. acrylate; alkoxylated hexanediol diacrylate; 1,6 hexanediol diacrylate; tetraethylene glycol diacrylate; triethylene glycol diacrylate; tripropylene glycol diacrylate; methypentanediol diacrylate; polyethylene glycol (400) diacrylate; dipropylene glycol diacrylate; (Propoxylated Neopentyl Glycol) diacrylate esters; alkoxylated aliphatic diacrylate; 1,6 hexanediol (EO)n diacrylate; polyethylene glycol 300 diacrylate; ethoxylated(20) trimethylolpropane triacrylate; ethoxylated(3) trimethylolpropane triacrylate; ethoxylated(6) trimethylolpropane triacrylate; ethoxylated(15)trimethylolpropane triacrylate; or propoxylated(3) glyceryl triacrylate, among others.

Oligomer Component

Embodiments of an ink composition can include a oligomer component that is any of acrylated linseed oil oligomer; acrylated polyester oligomer; acrylic oligomer/monomer blend; aliphatic silicone acrylate; aliphatic urethane acrylate oligomer; amine modified polyether acrylate oligomer; aromatic urethane acrylate; chlorinated polyester; epoxidized soy bean oil acrylate; epoxy acrylate blended with monomers; epoxy acrylate oligomer; epoxy novolak acrylate blended with monomers; fluorinated acrylate oligomer; hexafunctional urethane acrylate; low viscosity acrylic oligomer; low viscosity aromatic monoacrylate; low viscosity diacrylate oligomer; low viscosity oligomer; low viscosity triacrylate oligomer; modified epoxy acrylate; polyester acrylate oligomer; siliconized urethane acrylate oligomer; trifunctional urethane acrylate; urethane acrylate oligomer; urethane acrylate/acrylic ester blend, among others.

Photo-Initiator Component

Embodiments of an ink composition may include a photo-initiator component that is any of 1-hydroxy-cyclohexyl-phenyl-ketone; 2-hydroxy-2-methyl-1-phenyl-propan-1-one; bifunctional hydroxyacetophenone; 2-methyl-1[4-(methylthio)phenyl]-2-morpholinopropan-1-one; 2-benzyl-2-dimethylamino-1-(4-morpholinophenyl)-butanone-1; "2-dimethylamino-2-(4-methyl-benzyl)-1-(4-orpholin-4-yl-phenyl)-butan-1-one"; bis(2,4,6-trimethylbenzoyl)-phenyl-phosphineoxide; 2,4,6-trimethylbenzoyl-diphenyl-phosphineoxide; 2,4,6-trimethylbenzoylphenyl phosphinate; Isopropylthioxanthone; 2,4-diethylthioxanthone; 4-phenyl-benzophenone; benzophenone; 4-benzoyl-4'-methyl diphenyl sulphide; phenyl glyoxylic acid methyl ester; 2,2-dimethoxy-1,2-diphenylethan-1-one; oligo[2-hydroxy-2-methyl-1-[4-(1-methylvinyl)phenyl]propanone]; or 2-hydroxy-4'-(2-hydroxyethoxy)-2-methyl-propiophenone, among others. Embodiments of the ink composition may include a photo-initiator component that utilizes or requires amine as a co-initiator, for example, to facilitate or enable the photo-initiator component to result in activation of polymerization upon exposure to UV radiation. The amine can be any of, such as those under the designation of Ebecryl 7100, Ebecryl P-115, Ebecryl P-104, or Ebercryl LED 02 from Allnex USA Inc. (Alpharetta, Ga.), or those under the designation of Genomer 5161, Genomer 5142, Genomer 5275, or Genomer 5271 from RAHN USA Corp. (Aurora, Ill.). or those under the designation of CN 371, CN 383, or CN 386 from SARTOMER USA, LLC (Exton, Pa.), or those under the designation of Photomer 4967, Photomer 4771, Photomer 4250, photomer 4775, or Photomer 5006 from IGM Resins USA, Inc. (Charlotte, N.C.), or those under the designation of Photocryl A101 or Photocryl A102 from Miwon North America Inc. (Exton, Pa.), among others.

Additive Component

Embodiments may further include one or more additive components. Various additives may be included in the ink compositions, including any of a surfactant, leveling additive, stabilizer, dispersant, inhibitor, among others. Embodiments of an ink composition may include a dispersant component that is any of Disperbyk 111 or Disperbyk 180 from BYK-Chemie GmbH (Wesel, Germany), among others. Embodiments of an ink composition may include an inhibitor that is any of Genorad 16 from RAHN USA Corp. (Aurora, Ill.); UV-22 from BASF Corporation (Florham Park, N.J.); Florstab UV-1, or UV-8 from Kromachem Ltd. (Farmingdale, N.J.); Phonothiaine; CN 3216 from Sartmer Americas (Exton, Pa.); hydroquinone; t-butyl catechol; among others. Embodiments of an ink composition may include an additive that is any of BYK307, BYK UV-3510, BYK UV-3570, etc. from BYK USA Inc. (Wallingford, Conn.); or Tego Rad 2100, Tego Rad 2200N, etc. from Evonik Corporation (Richmond, Va.), among others.

Finish

Embodiments of the ink composition can have any of various finishes after the ink composition is fused with a glass, ceramic, or metal substrate. For example, an ink composition can be individualized to provide for a glossy finish (e.g., light reflectance of 70% or higher), a matte finish (e.g., light reflectance below 70%, and preferably below 40%), a transparent finish (e.g., light transmission is above 80%), an opaque finish (e.g., light transmission below 20%, and preferably below 5%), a metallic effect finish, etc. A glossy finish can be an opaque glossy finish, a transparent gloss finish, etc. An opaque glossy finish is a finish that is colorful but not transparent, and that is glossy in appearance. An opaque matte finish is a finish that is colorful but not transparent, and that is matte in appearance. A transparent glossy finish is a finish that is colorful and transparent that has high clarity, and that is glossy in appearance. A translucent matte finish is a finish that is colorful with high light transmission, but is not transparent and has a satin finish appearance. A metallic effect finish is a finish that is reflective and that has a metallic appearance. Performance of finishes can be characterized by any of various measurable characteristics, such as color, opacity, gloss, reflectance, clarity, etc.

Various components can be individualized to obtain a desired finish. For example, the composition of the frits can be individualized, the composition of the chromophore can be individualized, the particle size of the frits or chromophore can be individualized, the ratio of frits and chromophore can be individualized, colored frits can be used, the method of printing can be individualized, the firing process can be individualized, etc. In an example, a layer of ink composition B is applied as a top layer of multiple applied layers of an ink composition in order to achieve a desired gloss or texture of the surface.

Application

Figure 1:
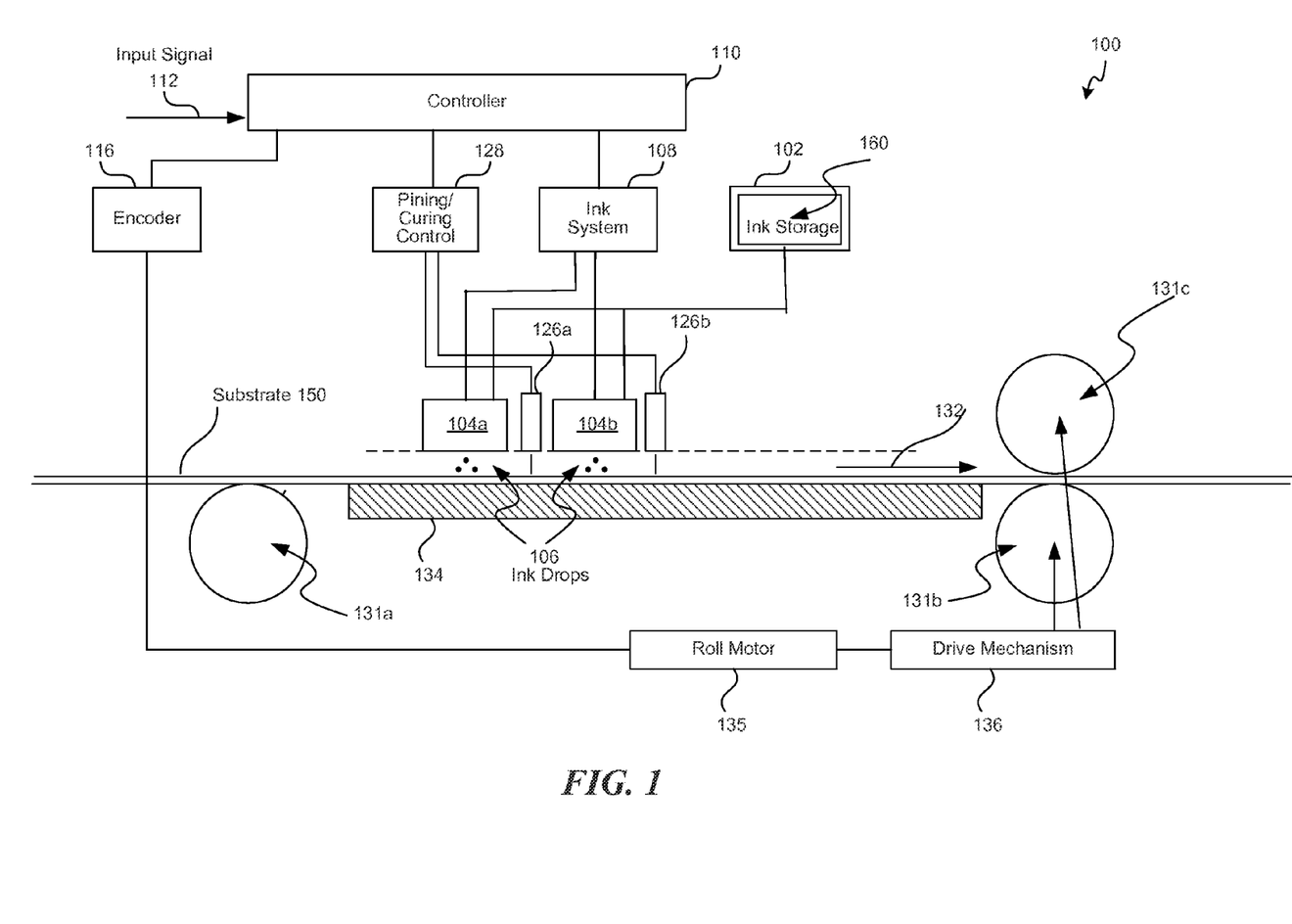
FIG. 1 is a schematic of an inkjet print system for applying a radiation-curable inkjet ink to a glass, ceramic, or metal substrate, consistent with various embodiments.

FIG. 1 is a schematic of an inkjet print system for applying a radiation-curable inkjet ink to a glass, ceramic, or metal substrate, consistent with various embodiments. While the inkjet print system of FIG. 1 is designed to print on a flat substrate, other embodiments of inkjet print systems can print on a curved substrate including substrates of various shapes, such as a bottle, a windshield, a vase, etc. Inkjet print system 100 of the embodiment of FIG. 1 is a single pass roll to roll inkjet printer. Inkjet print system 100 moves substrate 150, which can be glass, ceramic, or metal and which is supported by a platen 134 (which can include rollers on the surface of platen 134), from substrate holder 131a to substrate holder 131b, where substrate 150 passes under one or more print heads 104 and one or more UV radiation emitters 126. In some embodiments, substrate 150 moves past UV radiation emitters 126 at a speed of between 10 and 70 feet per minute to facilitate proper curing of the ink composition. Print heads 104 include inkjets for jetting ink composition 160 obtained from ink storage 102 onto substrate 150. In some embodiments, an inkjet print system is designed such that a substrate, such as substrate 150, remains in a fixed position, and print heads, such as print heads 104, move in two or even three dimensions in order to position the print heads to efficiently jet an ink composition on a substrate.

Because print quality is affected by the size of ink drops 106, and the distance that the ink composition needs to be jetted (i.e., the distance between the inkjets of print heads 104 and substrate 150), being able to move print heads 104 in three dimensions is important in certain applications, such as when applying the ink composition to uneven surfaces. The distance between prints heads 104 and substrate 150 can be based on the material of substrate 150. For example, when substrate 150 is ceramic, the distance between print heads 104 and substrate 150 may need to be more than when substrate 150 is glass, due to the surface of the glass being smooth and the surface of the ceramic being rough (in comparison to the surface of the glass). Inkjet print system 100 also includes controller 110, ink storage 102 that contains ink composition 160, encoder 116, pinning/curing control 128, ink system 108, roll motor 135, and drive mechanism 136.

Controller 110, which includes a processor, memory, etc., can control various components of inkjet print system 100. Input 112 can be, for example, a file that includes raster data, which is used to control the ink that is emitted from print heads 104, and that includes pinning/curing data, which is used to control the power of UV radiation emitters 126 and the speed at which substrate holders 131b and 131c move substrate 150 past UV radiation emitters 126 and print heads 104. Controller 110 can send instructions for controlling the movement of substrate holders 131b and 131c to encoder 116, which can convert the instructions into control signals to control roll motor 135, such that roll motor 135 causes drive mechanism 136 to turn print substrate holders 131b and 131c to rotate at the desired speed and in the desired direction. Controller 110 can send instructions for pinning or curing the ink to pinning/curing control 128, which can convert the instructions into control signals that cause UV radiation emitters 126 to output UV radiation at a power level tuned to pin and cure the ink that is applied by print heads 104.

Controller 110 can read a file received via input signal 112 that contains raster data, and can convert the raster data to instructions for ink system 108, which can convert the instructions into control signals that cause print heads 104 to eject ink drops 106 onto the surface of substrate 150. Print heads 104 can get ink composition 160 from ink holder 102. Controller 110 can also control the speed that substrate 150 moves past UV radiation emitters 126 and print heads 104.

Figure 2:
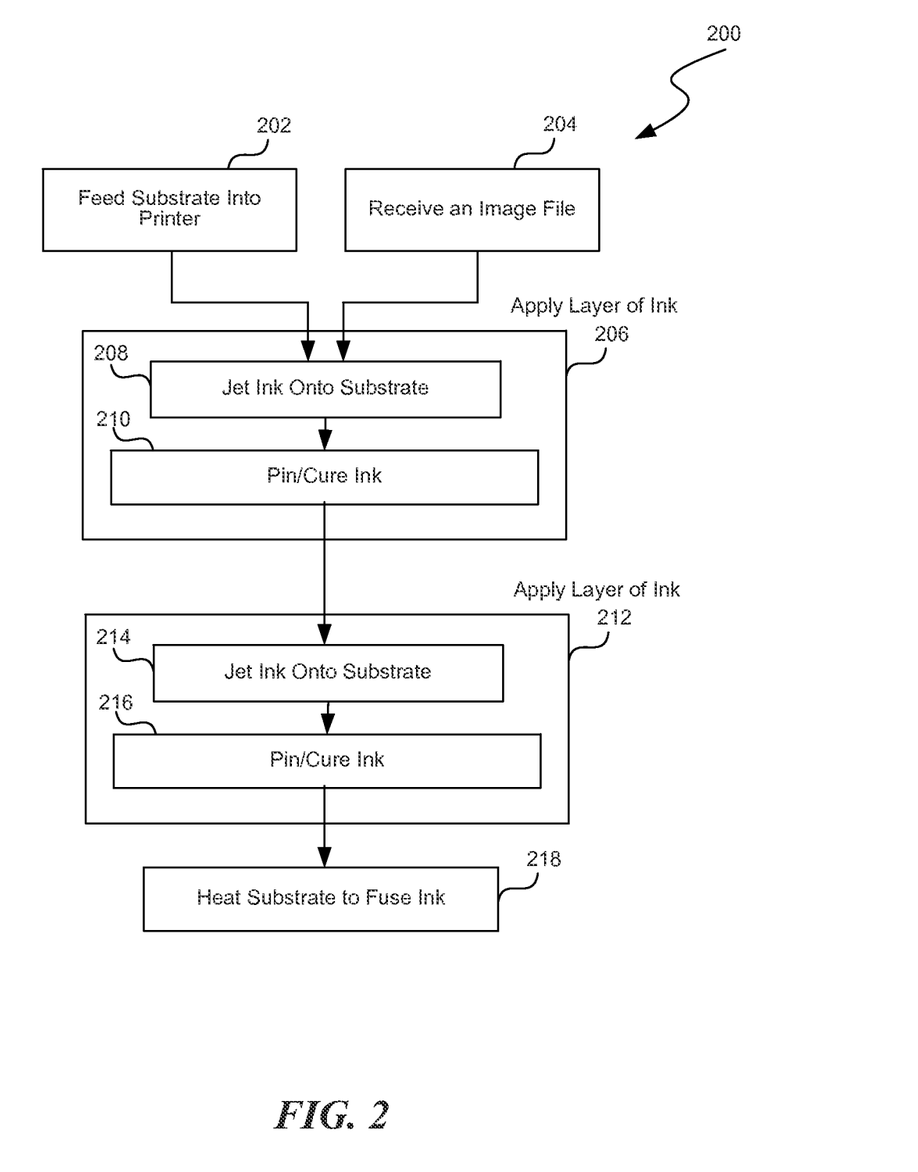
FIG. 2 is a flow diagram illustrating a process for printing multiple layers of ink on a metal, ceramic, or metal substrate, consistent with various embodiments.

FIG. 2 is a flow diagram illustrating a process for printing multiple layers of ink on a metal, ceramic, or metal substrate, consistent with various embodiments. While FIG. 2 illustrates a process for applying two layers of ink to a substrate, the process of FIG. 2 can be used extended to apply an arbitrary number of layers of ink. The process embodied in FIG. 2 will be described using inkjet print system 100 of FIG. 1, and the examples of FIG. 3. An operator loads a glass, metal, or ceramic substrate, such as substrate 150 of FIG. 1, onto substrate holder 131a and pushes the substrate until substrate holders 131b and 131c can grab the substrate (step 202). Substrate 150 can be any of substrates 305a-e of FIG. 3. Controller 110 of inkjet print system 100 receives an image file (step 204) via input signal 112. The raster data defines a print pattern for an image that is to be printed on the substrate by inkjet print system 100. The instructions that define the print pattern can control the amounts and types of inks that are jetted by print heads 104, which are inkjet print heads, at the various pixel locations of the product label.

An inkjet print head can jet one or more drops of ink to achieve a desired pixel appearance. The raster data can define the location where each drop of ink should be jetted, the amount of ink to be jetted for each drop, the formulation/color of each drop of ink to be jetted, etc. In some embodiments, to achieve a certain color, an inkjet printer can jet multiple drops of ink in varying amounts to blend the colors of the individual drops to form a desired color. For example, an inkjet printer can jet drops of cyan, magenta, yellow, black, red, green, blue, or black ink in varying defined amounts to achieve a desired color, such as to achieve a desired shade of purple for a pixel.

Inkjet print system 100 applies a layer of ink to the surface of substrate 150 (step 206), such as via inkjet print head 104a. Inkjet print system 100 can jet one or more drops of ink for each pixel, and each drop can be of a different type/color/amount/composition/formulation/etc. of ink. The layer of ink printed by inkjet print system 100 can be, for example, ink 310 of FIG. 3. Controller 110, based on the raster data of the image file, sends control signals to the various components of inkjet print system 100 to cause a layer of ink to be printed, such as to form an image. The image formed by the jetting of individual drops can be any arbitrary image, such as an image of a person's face, an image of an object, etc.

For example, controller 110, based on the raster data of the image file, sends instructions to ink system 108, which converts the instructions into control signals that are sent to print heads 104. Print heads 104 jet out ink drops 106 onto substrate 150 to print the image onto the surface of substrate 150. Each print head can print a different type/color/formulation/composition/etc. of ink or a same type/color/formulation/composition/etc. of ink. In some embodiments that contain multiple print heads, each of the print heads can print a different or a same type/color/formulation/composition/etc. of ink. For example, print head 104a can jet a first ink composition, such as ink 310 of FIG. 3, and print head 104b can jet a second ink composition, such as ink 311 of FIG. 3. Further, both the first and second ink compositions can be jetted (and UV cured by UV radiation emitters 126a and 126b) during a single pass of substrate 150 through inkjet print system 100.

Controller 110, also based on the raster data, causes print heads 104 to be accurately positioned for each pixel that is printed. Print heads 104 are mounted on a print head assembly, which can, based on instructions from controller 110, move the print heads back and forth across substrate 150 to control the location in a first direction (the first direction being perpendicular to the direction that substrate holders 131b and 131c move substrate 105). Substrate holders 131b and 131c can move substrate 150 back and forth under print heads 104 in a second direction. By controlling the location of print heads 104 in the first direction, and substrate 150 in the second direction, controller 110 can cause each pixel to be printed at an accurate location. In some embodiments, the print heads are in a fixed position, and substrate 150 is transported past the print heads in a single-pass (non-indexing) mode.

To stabilize the ink after jetting, controller 110 sends instructions to pinning/curing control 128 to cause UV radiation emitters 126 to pin or cure the ink after each layer of ink is applied (step 210). For example, UV radiation emitter 126a can pin or cure a first ink composition that is jetted by print head 104a, and UV radiation emitter 126b can pin or cure a second ink composition that is jetted by print head 104b. Pinning/curing control 128 can pin or cure the ink by sending a signal to UV radiation emitters 126 that causes UV radiation emitters 126 to emit UV radiation of sufficient intensity or power to pin or cure the ink(s), which controls or stops the spread of ink drops 106 after landing on substrate 150.

After a first layer of ink is applied and pinned or cured, a second layer of ink can be applied. In some embodiments, both the first layer of ink and the second layer of ink are jetted during the same pass of substrate 150 through inkjet print system 100. In other embodiments, one layer of ink is jetted per pass of substrate 150 through an inkjet print system. Each pass of substrate 150 through an inkjet print system can be through a same inkjet print system, through different inkjet print systems, etc. Steps 212, 214, and 216 are, respectively, substantially the same as steps 206, 208, and 210.

At step 218, an operator removes substrate 150 from inkjet print system 100 and places the substrate in, for example, a kiln to heat the substrate. The substrate is heated to a temperate that causes the ink to fuse into substrate 150, such as by glass frits of the ink melting and fusing with substrate 150.

Figure 3:
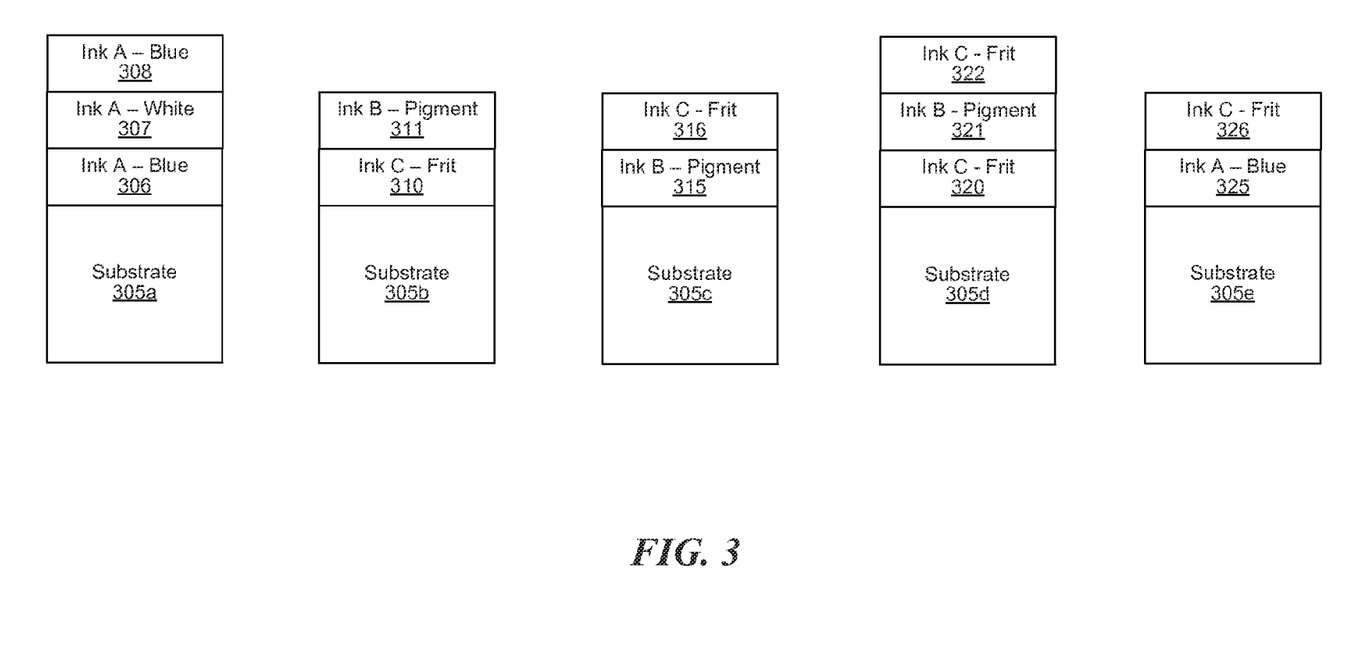
FIG. 3 is an illustration of five examples of a glass, ceramic, or metal substrate with multiple layers printed on the substrate, consistent with various embodiments.

While FIG. 2 illustrates a process that applies two layers of ink to a substrate, the process of FIG. 2 can be extended for an arbitrary number of layers by repeating steps 212-216 for each additional layer of ink. For example, steps 206-210 can be used to apply ink 306 to substrate 305a, and steps 212-216 can be repeated to apply inks 307 and 308 to substrate 305a. Further, the ink composition that is applied at each of the ink application steps (e.g., step 208, step 214) can be any of the previously discussed ink compositions, among others. For example, each of the various layers of ink can be any of ink composition A, ink composition B, or ink composition C, among others.

FIG. 3 is an illustration of five examples of a glass, ceramic, or metal substrate with multiple layers printed on the substrate, consistent with various embodiments. In a first example, the process of FIG. 2 is used to apply three layers of ink, ink 306, ink 307, and ink 308, to substrate 305a. A layer of ink can be formed of multiple drops of ink, and each drop of ink can have been jetted by an inkjet print head. While the ink of each layer of ink of each of the five examples of FIG. 3 is of the same color and composition, each drop of ink of each ink layer can be a different color/type/amount/formulation/composition/etc.

Each layer of ink is cured by exposure to UV radiation before the next layer of ink is applied. In this example, each of inks 306-308 is a formulation of ink composition A. Inks 306 and 308 include a chromophore component that colors the ink blue, and ink 307 includes a chromophore component that colors the ink white. By providing a white background (e.g., ink 307) behind a colored ink (e.g., ink 308), the color of the colored ink can be enhanced. In this example, the color of blue ink 308 is enhanced by having a background of white ink 307. In another example where ink 308 forms part of an image of a person's face, the image of the person's face (which is formed by multiple drops of ink that are part of the same layer of ink as ink 308, but are not shown in the illustration of FIG. 3) is enhanced by having a background of white ink 307.

Further, when substrate 305a is a transparent substrate, such as a glass substrate, ink 306 is visible when looking through the transparent substrate from the opposite side of the substrate. In this case, the color of blue ink 306 is also enhanced by having a background of white ink 307.

In second through fourth examples, the process of FIG. 2 is used to apply alternating layers of ink compositions B and C. In the second example, the process of FIG. 2 is used to apply ink 310, which is a formulation of ink composition C, to substrate 305b, and to apply ink 311, which is a formulation of ink composition B, to substrate 305b. In the third example, the process of FIG. 2 is used to apply ink 315, which is a formulation of ink composition B, to substrate 305c, and to apply ink 316, which is a formulation of ink composition C, to substrate 305c. In the fourth example, the process of FIG. 2 is used to apply ink 320, which is a formulation of ink composition C, to substrate 305d, to apply ink 321, which is a formulation of ink composition B, to substrate 305d, and to apply ink 322, which is a formulation of ink composition C, to substrate 305d.

By applying multiple layers of various formulations of ink, as is illustrated in the second through fourth examples, a variety of different appearances of a final product can be achieved. Various types of color intensity, surface gloss, surface texture, etc. of a final product can be achieved using various combinations of ink compositions. As one example, an ink layer that is a formulation of ink composition B, which includes a UV curable component and a chromophore component, can have a higher concentration of pigment, which can allow for a more intense or solid color. As another example, an ink layer that is a formulation of ink composition C, which includes a UV curable component and a frits component, can be used to vary the surface texture or appearance.

In some cases when the top ink layer is a formulation of ink composition C, as is illustrated in the third and fourth examples, the surface can be enhanced, such as to make the surface glossy, matte, etc., based on the individualization of the ink formulation. In some cases when the top layer is a formulation of ink composition B, as is illustrated in the second example, the surface can also be enhanced, such as by making the color intense or solid. Further, the frits component of each of the formulations of ink composition C in the second through fourth examples can help the pigments of the chromophore components of those examples to fuse with the substrate.

In the fifth example, the process of FIG. 2 is used to apply ink 325, which is a formulation of ink composition A, and to apply ink 326, which is a formulation of ink composition C. The formulation of ink composition C can be individualized to achieve desired surface features and to control the final product appearance. For example, the formulation of ink composition C can be individualized to achieve a glossy finish, a matte finish, a smooth texture, a rougher texture, etc. As should be apparent from the above examples, various types and formulations of ink compositions can be applied in any of various orders to a substrate in order to achieve a desired appearance, gloss, texture, etc. of the substrate.

Figure 4:
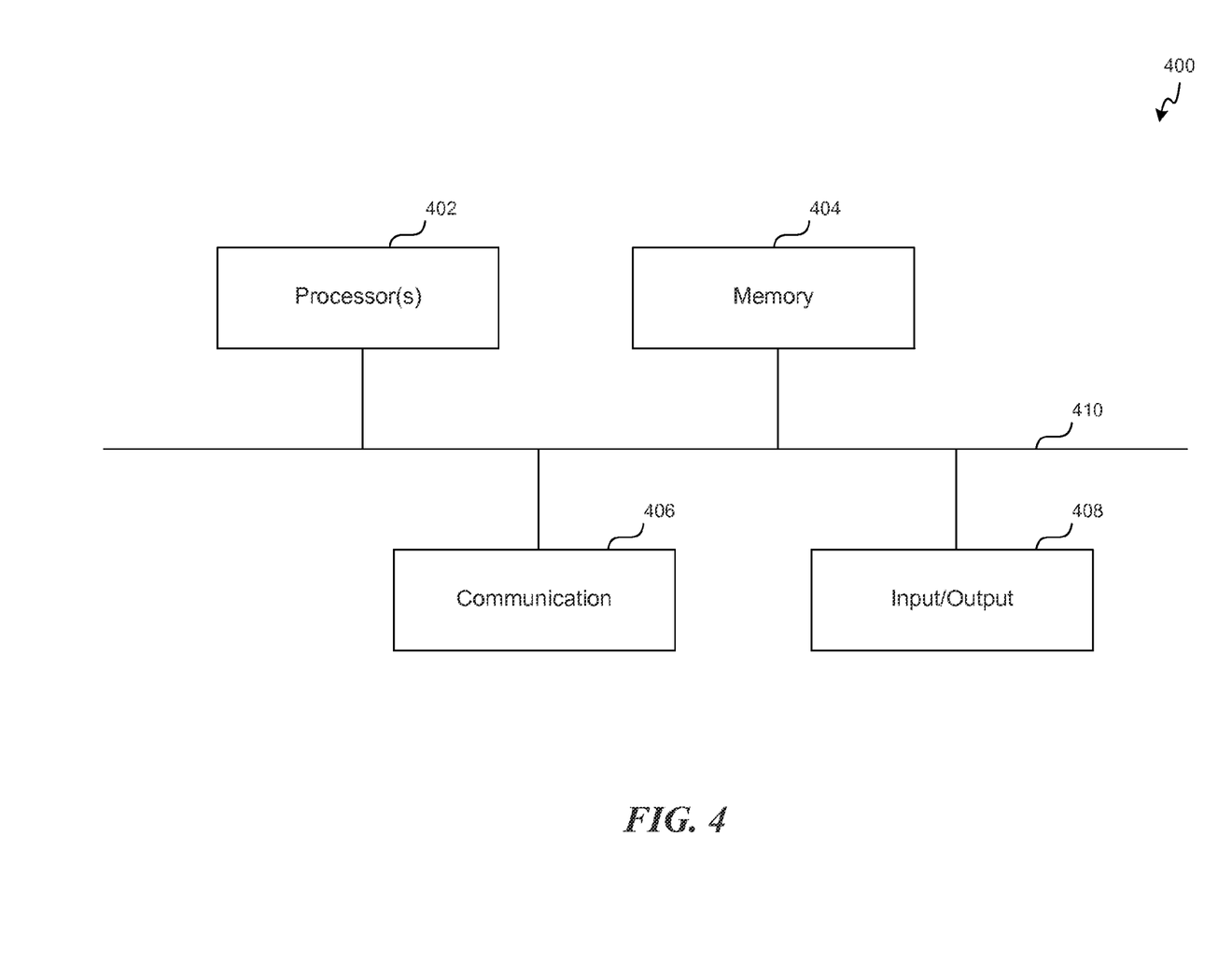
FIG. 4 is a high-level block diagram showing an example of processing system in which at least some operations related to the disclosed technique can be implemented, consistent with various embodiments.

FIG. 4 is a high-level block diagram showing an example of a processing device 400 that can represent any of the devices described above, such as controller 110, pinning/curing control 128, ink system 108, etc. Any of these systems may include two or more processing devices such as represented in FIG. 4, which may be coupled to each other via a network or multiple networks. A network can be referred to as a communication network.

In the illustrated embodiment, the processing system 400 includes one or more processors 402, memory 404, a communication device 406, and one or more input/output (I/O) devices 408, all coupled to each other through an interconnect 410. The interconnect 410 may be or include one or more conductive traces, buses, point-to-point connections, controllers, adapters and/or other conventional connection devices. Each processor 402 may be or include, for example, one or more general-purpose programmable microprocessors or microprocessor cores, microcontrollers, application specific integrated circuits (ASICs), programmable gate arrays, or the like, or a combination of such devices. The processor(s) 402 control the overall operation of the processing device 400. Memory 404 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 404 may store data and instructions that configure the processor(s) 402 to execute operations in accordance with the techniques described above. The communication device 406 may be or include, for example, an Ethernet adapter, cable modem, Wi-Fi adapter, cellular transceiver, Bluetooth transceiver, or the like, or a combination thereof. Depending on the specific nature and purpose of the processing device 400, the I/O devices 408 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

As will be understood by those familiar with the art, the ink compositions may be embodied in other specific forms without departing from the spirit or essential characteristics thereof. Likewise, the particular naming and division of the members, features, attributes, and other aspects are not mandatory or significant, and the mechanisms that implement the various embodiments or their features may have different names, divisions and/or formats. Accordingly, the present disclosure is intended to be illustrative, but not limiting, of the scope of the ink compositions, which scope is set forth in the following Claims.

The invention claimed is:

1. A ultra-violet (UV) radiation-curable, frit-based, inkjet ink composition for application by an inkjet printer to glass, ceramic, or metal, the inkjet ink composition consisting of:
   a glass frits component, present in the inkjet ink composition in a predetermined concentration, with a melting point of less than 750 degrees Celsius (C) and a median diameter (D50) of less than 10 microns,
      wherein the glass frits component is individualized to fuse with a glass, ceramic, or metal substrate after the inkjet ink composition is applied to the glass, ceramic, or metal substrate by an inkjet printer, and after the inkjet ink composition is heated to a temperature above the melting point of the glass frit component and below the melting point of the glass, ceramic, or metal substrate;

a chromophore component, present in the inkjet ink composition in a predetermined concentration, that is individualized to maintain color performance after being heated to 500 degrees C. for 5 minutes,
wherein the chromophore component includes an inorganic pigment that is individualized to obtain a selected color after being fused with the glass, ceramic, or metal substrate; and an ultra-violet (UV) curable component, present in the inkjet ink composition in a predetermined concentration, that is individualized to an UV absorbance signature of the inkjet ink composition to result, after the inkjet ink composition is applied to the glass, ceramics, or metal by the inkjet printer, in activation of polymerization when exposed to UV radiation,
wherein the UV curable component is individualized to facilitate the glass frits component and the chromophore component being jetted, as part of the inkjet ink composition, by an inkjet of the inkjet printer.

2. The inkjet ink composition of claim 1, wherein the glass frits component has a melting point of less than 550 degrees C. which facilitates melting of the glass frits component at a temperature that is lower than the melting point of the glass, ceramic, or metal substrate.

3. The inkjet ink composition of claim 1, wherein the chromophore component is individualized to maintain color performance after being heated to 800 degrees C. for 40 minutes.

4. The inkjet ink composition of claim 1, wherein the glass frits component comprises between 20 and 45 percent by weight of the inkjet ink composition.

5. The ink composition of claim 1, wherein the UV-curable component includes a photo-initiator component, and wherein the photo-initiator component comprises any of:
    1-hydroxy-cyclohexyl-phenyl-ketone,
    2-hydroxy-2-methyl-1-phenyl-propan-1-one,
    bifunctional hydroxyacetophenone,
    2-methyl-1[4-(methylthio)phenyl]-2-morpholinopropan-1-one,
    2-benzyl-2-dimethylamino-1-(4-morpholinophenyl)-butanone-1,
    2-dimethylamino-2-(4-methyl-benzyl)-1-(4-orpholin-4-yl-phenyl)-butan-1-one,
    bis(2,4,6-trimethylbenzoyl)-phenylphosphineoxide,
    2,4,6-trimethylbenzoyl-diphenyl-phosphineoxide,
    2,4,6-trimethylbenzoylphenyl phosphinate,
    isopropylthioxanthone,
    2,4-diethylthioxanthone,
    4-phenylbenzophenone,
    benzophenone,
    4-benzoyl-4'-methyl diphenyl sulphide,
    phenyl glyoxylic acid methyl ester,
    2,2-dimethoxy-1,
    2-diphenylethan-1-one, or
    oligo [2-hydroxy-2-methyl-1-[4-(1-methylvinyl) phenyl] propanone].

6. The ink composition of claim 1, wherein the UV curable component includes a photo-initiator component that utilizes amine to enable the photo-initiator component to result in the activation of the polymerization upon the exposure to the UV radiation, and wherein the amine comprises any of:
    Ebecryl 7100,
    Ebecryl P-115,
    Ebecryl P-104,
    Ebercryl LED 02,
    Genomer 5161,
    Genomer 5142,
    Genomer 5275,
    Genomer 5271,
    CN 371,
    CN 383,
    CN 386,
    Photomer 4967,
    Photomer 4771,
    Photomer 4250,
    Photomer 4775,
    Photomer 5006,
    Photocryl A101, or
    Photocryl A102.

7. The ink composition of claim 1, wherein the UV curable component includes a monomer component that is any of a linear monoacrylate monomer, a cyclic monofunctional monomer, an aromatic monofunctional monomer, a difunctional acrylate monomer, a trifunctional acrylate monomer, or a tetra/higher functional acrylate monomer, and wherein the monomer component includes any of:
    cycloaliphatic acrylate monomer,
    2(2-ethoxyethoxy) ethyl acrylate,
    tetrahydrofurfuryl acrylate,
    lauryl acrylate,
    2-phenoxyethyl acrylate,
    isodecyl acrylate,
    acrylic monomer,
    octyldecyl acrylate,
    octyl ester,
    tridecyl acrylate,
    caprolactone acrylate,
    isobornyl acrylate,
    cyclic trimethylolpropane formal acrylate,
    alkoxylated tetrahydrofurfuryl acrylate,
    1,4-butanediol monoacrylate,
    alip. ureth. acrylate,
    alkoxylated hexanediol diacrylate,
    1,6 hexanediol diacrylate,
    tetraethylene glycol diacrylate,
    triethylene glycol diacrylate,
    tripropylene glycol diacrylate,
    methypentanediol diacrylate,
    polyethylene glycol (400) diacrylate,
    dipropylene glycol diacrylate,
    (Propoxylated Neopentyl Glycol) diacrylate esters,
    alkoxylated aliphatic diacrylate,
    1,6 hexanediol (EO)n diacrylate,
    polyethylene glycol 300 diacrylate,
    ethoxylated(20) trimethylolpropane triacrylate,
    ethoxylated(3) trimethylolpropane triacrylate,
    ethoxylated(6) trimethylolpropane triacrylate,
    ethoxylated(15)trimethylolpropane triacrylate, or
    propoxylated(3) glyceryl triacrylate.

8. The ink composition of claim 1, wherein the UV curable component includes an oligomer component that includes any of:
    acrylated linseed oil oligomer,
    acrylated polyester oligomer,
    acrylic oligomer/monomer blend,
    aliphatic silicone acrylate,
    aliphatic urethane acrylate oligomer,
    amine modified polyether acrylate oligomer, aromatic urethane acrylate,
chlorinated polyester,
epoxidized soy bean oil acrylate,
epoxy acrylate blended with monomers,
epoxy acrylate oligomer,
epoxy novolak acrylate blended with monomers,
fluorinated acrylate oligomer,
hexafunctional urethane acrylate,
low viscosity acrylic oligomer,
low viscosity aromatic monoacrylate,
low viscosity diacrylate oligomer,
low viscosity oligomer,
low viscosity triacrylate oligomer,
modified epoxy acrylate,
polyester acrylate oligomer,
siliconized urethane acrylate oligomer,
trifunctional urethane acrylate,
urethane acrylate oligomer, or
urethane acrylate/acrylic ester blend.

9. An ink composition comprising:
an ultra-violet (UV) curable component, present in the ink composition in a predetermined concentration, that is individualized to a UV absorbance signature of the ink composition to result, after the ink composition is applied to a glass, ceramic, or metal substrate by an inkjet printer, in activation of polymerization upon exposure to UV radiation, wherein the UV curable component includes a monomer component that includes a predetermined amount of oxygen; and
a glass frits component, present in the ink composition in a predetermined concentration, with a melting point of less than 750 degrees Celsius (C),
wherein the glass frits component has a median diameter (D50) of less than 10 microns to facilitate flowing of the ink composition through an inkjet of the inkjet printer.

10. The ink composition of claim 9, wherein the glass frits component has a melting point of less than 550 degrees C.

11. The ink composition of claim 9, wherein the glass frits component comprises no more than 70 percent by weight of the ink composition.

12. The ink composition of claim 9, wherein the UV curable component includes an additive component individualized to facilitate application of the ink composition to the glass, ceramic, or metal substrate by the inkjet printer.

13. The ink composition of claim 12, wherein the additive component includes any of a surfactant, a leveling additive, a stabilizer, a dispersant, or an inhibitor.

14. The ink composition of claim 9, wherein the UV curable component is individualized to result in the ink composition having a viscosity of between 5 and 45 centipoise at 25 degrees C., and in having a surface tension of between 20 and 50 millinewtons per meter (mN/m) at 25 degrees C., to facilitate the application of the ink composition to the glass, ceramic, or metal substrate by the inkjet printer.

15. The ink composition of claim 9, wherein the UV-curable component includes a photo-initiator component that includes a photo-initiator selected from a group comprised of photo-initiators that facilitate polymerization when exposed to UV-A radiation, photo-initiators that facilitate polymerization when exposed to UV-B radiation, and photo-initiators that facilitate polymerization when exposed to UV-C radiation.

16. The ink composition of claim 9, wherein the exposure to the UV radiation comprises exposure to any of UV-A radiation, UV-B radiation, or UV-C radiation.

17. The ink composition of claim 9, wherein the UV-curable component includes a photo-initiator component, and wherein the photo-initiator component comprises any of:
1-hydroxy-cyclohexyl-phenyl-ketone,
2-hydroxy-2-methyl-1-phenyl-propan-1-one,
bifunctional hydroxyacetophenone,
2-methyl-1[4-(methylthio)phenyl]-2-morpholinopropan-1-one,
2-benzyl-2-dimethylamino-1-(4-morpholinophenyl)-butanone-1,
2-dimethylamino-2-(4-methyl-benzyl)-1-(4-orpholin-4-yl-phenyl)-butan-1-one,
bis(2,4,6-trimethylbenzoyl)-phenylphosphineoxide,
2,4,6-trimethylbenzoyl-diphenyl-phosphineoxide,
2,4,6-trimethylbenzoylphenyl phosphinate,
isopropylthioxanthone,
2,4-diethylthioxanthone,
4-phenylbenzophenone,
benzophenone,
4-benzoyl-4'-methyl diphenyl sulphide,
phenyl glyoxylic acid methyl ester,
2,2-dimethoxy-1,
2-diphenylethan-1-one, or
oligo [2-hydroxy-2-methyl-1-[4-(1-methylvinyl) phenyl] propanone].

18. The ink composition of claim 9, wherein the UV curable component includes a photo-initiator component that utilizes amine as a co-initiator, and wherein the amine comprises any of:
Ebecryl 7100,
Ebecryl P-115,
Ebecryl P-104,
Ebercryl LED 02,
Genomer 5161,
Genomer 5142,
Genomer 5275,
Genomer 5271,
CN 371,
CN 383,
CN 386,
Photomer 4967,
Photomer 4771,
Photomer 4250,
Photomer 4775,
Photomer 5006,
Photocryl A101, or
Photocryl A102.

19. The ink composition of claim 9, wherein the glass frits component includes glass comprised of $SiO_2$ doped with any of Bi, B, Zn, Na, K, F, Ca, Mg, Al, Ti, or Zr, and wherein the glass frits component has a median diameter (D50) of less than 3 microns.

20. The ink composition of claim 9, wherein the monomer component is any of a linear monoacrylate monomer, a cyclic monofunctional monomer, an aromatic monofunctional monomer, a difunctional acrylate monomer, a trifunctional acrylate monomer, or a tetra/higher functional acrylate monomer.

21. The ink composition of claim 20, wherein the monomer component includes any of:
cycloaliphatic acrylate monomer,
2(2-ethoxyethoxy) ethyl acrylate,
tetrahydrofurfuryl acrylate,
lauryl acrylate,
2-phenoxyethyl acrylate,
isodecyl acrylate, acrylic monomer,
octyldecyl acrylate,
octyl ester,
tridecyl acrylate,
caprolactone acrylate,
isobornyl acrylate,
cyclic trimethylolpropane formal acrylate,
alkoxylated tetrahydrofurfuryl acrylate,
1,4-butanediol monoacrylate,
alip. ureth. acrylate,
alkoxylated hexanediol diacrylate,
1,6 hexanediol diacrylate,
tetraethylene glycol diacrylate,
triethylene glycol diacrylate,
tripropylene glycol diacrylate,
methypentanediol diacrylate,
polyethylene glycol (400) diacrylate,
dipropylene glycol diacrylate,
(Propoxylated Neopentyl Glycol) diacrylate esters,
alkoxylated aliphatic diacrylate,
1,6 hexanediol (EO)n diacrylate,
polyethylene glycol 300 diacrylate,
ethoxylated(20) trimethylolpropane triacrylate,
ethoxylated(3) trimethylolpropane triacrylate,
ethoxylated(6) trimethylolpropane triacrylate,
ethoxylated(15)trimethylolpropane triacrylate, or
propoxylated(3) glyceryl triacrylate.

22. The ink composition of claim 9, wherein the predetermined amount of oxygen is individualized to achieve a desired burn off of the UV curable component when the ink composition is heated to a predetermined temperature after the ink composition has been cured by the exposure to the UV radiation.

23. The ink composition of claim 9, wherein the UV curable component includes acrylic resin.

24. The ink composition of claim 23, wherein the acrylic resin comprises less than 2 percent by weight of the ink composition.

25. The ink composition of claim 9, wherein the UV curable component includes an oligomer component.

26. The ink composition of claim 25, wherein the oligomer component includes any of:
   acrylated linseed oil oligomer,
   acrylated polyester oligomer,
   acrylic oligomer/monomer blend,
   aliphatic silicone acrylate,
   aliphatic urethane acrylate oligomer,
   amine modified polyether acrylate oligomer,
   aromatic urethane acrylate,
   chlorinated polyester,
   epoxidized soy bean oil acrylate,
   epoxy acrylate blended with monomers,
   epoxy acrylate oligomer,
   epoxy novolak acrylate blended with monomers,
   fluorinated acrylate oligomer,
   hexafunctional urethane acrylate,
   low viscosity acrylic oligomer,
   low viscosity aromatic monoacrylate,
   low viscosity diacrylate oligomer,
   low viscosity oligomer,
   low viscosity triacrylate oligomer,
   modified epoxy acrylate,
   polyester acrylate oligomer,
   siliconized urethane acrylate oligomer,
   trifunctional urethane acrylate,
   urethane acrylate oligomer, or
   urethane acrylate/acrylic ester blend.

27. A method of inkjet printing comprising:
   jetting an ink composition from an inkjet printer onto a glass, ceramic, or metal substrate, wherein said jetting of the ink composition includes jetting any of:
   A) a first ink composition consisting of:
   a glass frits component, present in the inkjet ink composition in a predetermined concentration, with a melting point of less than 750 degrees Celsius (C) and a median diameter (D50) of less than 10 microns,
      wherein the glass frits component is individualized to fuse with a glass, ceramic, or metal substrate after the inkjet ink composition is applied to the glass, ceramic, or metal substrate by an inkjet printer, and after the inkjet ink composition is heated to a temperature above the melting point of the glass frit component and below the melting point of the glass, ceramic, or metal substrate;
   a chromophore component, present in the inkjet ink composition in a predetermined concentration, that is individualized to maintain color performance after being heated to 500 degrees C. for 5 minutes,
      wherein the chromophore component includes an inorganic pigment that is individualized to obtain a selected color after being fused with the glass, ceramic, or metal substrate; and
   an ultra-violet (UV) curable component, present in the inkjet ink composition in a predetermined concentration, that is individualized to an UV absorbance signature of the inkjet ink composition to result, after the inkjet ink composition is applied to the glass, ceramics, or metal by the inkjet printer, in activation of polymerization when exposed to UV radiation,
      wherein the UV curable component is individualized to facilitate the glass frits component and the chromophore component being jetted, as part of the inkjet ink composition, by an inkjet of the inkjet printer; or
   B) a second ink composition consisting of:
   an ultra-violet (UV) curable component, present in the ink composition in a predetermined concentration, that is individualized to a UV absorbance signature of the ink composition to result, after the ink composition is applied to a glass, ceramic, or metal substrate by an inkjet printer, in activation of polymerization upon exposure to UV radiation; and
   a glass frits component, present in the ink composition in a predetermined concentration, with a melting point of less than 750 degrees Celsius (C),
   wherein the glass frits component has a median diameter (D50) of less than 10 microns to facilitate flowing of the ink composition through an inkjet of the inkjet printer; or
   C) a third ink composition consisting of:
   an ultra-violet (UV) curable component, present in the ink composition in a predetermined concentration, that is individualized to a UV absorbance signature of the ink composition to result, after the ink composition is applied to a glass, ceramic, or metal substrate by an inkjet printer, in activation of polymerization upon exposure to UV radiation; and
   a chromophore component, present in the ink composition in a predetermined concentration, that is individualized to maintain color performance after being heated to 500 degrees C.; and
   after the jetting of the ink composition, exposing the ink composition to ultra-violet (UV) radiation to activate polymerization of the ink composition, and to result in the ink composition being pinned to the glass, ceramic, or metal substrate.

28. The method of claim 27, further comprising:
after the ink composition is exposed to the UV radiation, heating the glass, ceramic, or metal substrate to between 450 degrees C. and 750 degrees C. to result in glass frits of the ink composition fusing with the glass, ceramic, or metal substrate.

29. The method of claim 27, further comprising:
jetting at least a second ink composition onto the glass, ceramic, or metal substrate; and
exposing the second ink composition to UV radiation to activate polymerization of the second ink composition, and to result in the second ink composition being pinned to the glass, ceramic, or metal substrate.

30. The method of claim 29, further comprising:
after the second ink composition is exposed to the UV radiation, heating the glass, ceramic, or metal substrate to between 450 degrees C. and 750 degrees C. to result in glass frits of the ink composition and glass frits of the second ink composition both fusing with the glass, ceramic, or metal substrate.

31. The method of claim 29, wherein the jetting of the second ink composition onto the glass, ceramic, or metal substrate includes jetting the second ink composition onto the ink composition after the ink composition is exposed to the UV radiation and is pinned to the glass, ceramic, or metal substrate.

32. The method of claim 29, wherein the glass, ceramic, or metal substrate comprises a flat glass, ceramic, or metal substrate, or a curved glass, metal, or ceramic substrate.

33. The method of claim 32, wherein the curved glass, metal, or ceramic substrate is a bottle, a windshield, or a vase.

34. The method of claim 29, wherein the ink composition and the second ink composition are jetted onto the glass, ceramic, or metal substrate during one pass of the glass, ceramic, or metal substrate through the inkjet printer.

35. The method of claim 29, wherein the ink composition and the second ink composition are jetted onto the glass, ceramic, or metal substrate during at least two passes of the glass, ceramic, or metal substrate through the inkjet printer.

* * * * *